I. MOSES.
Ambulance.

No. 21,615.

4 Sheets—Sheet 1.

Patented Sept. 28, 1858.

I. MOSES.
Ambulance.

No. 21,615.

4 Sheets—Sheet 2.

Patented Sept. 28, 1858

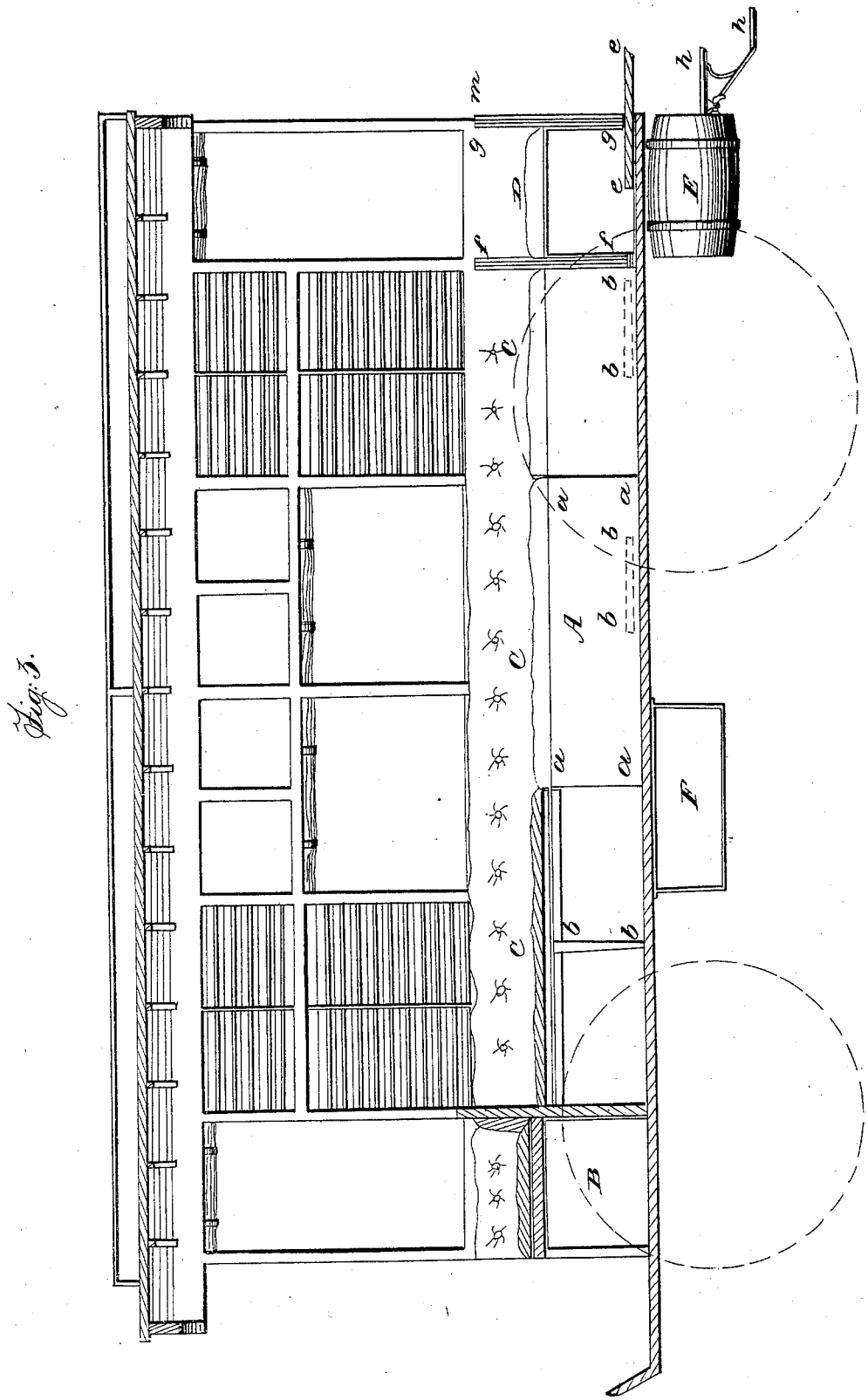

I. MOSES.
Ambulance.
No. 21,615.
4 Sheets—Sheet 4.
Patented Sept. 28, 1858.
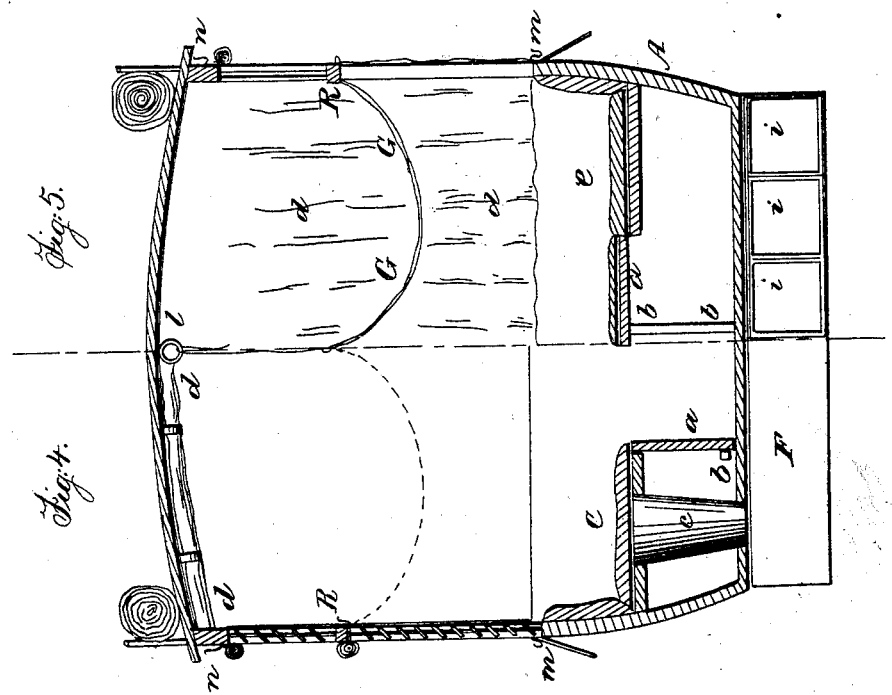

UNITED STATES PATENT OFFICE.

ISRAEL MOSES, OF NEW YORK, N. Y.

AMBULANCE-WAGON.

Specification of Letters Patent No. 21,615, dated September 28, 1858.

*To all whom it may concern:*

Be it known that I, ISRAEL MOSES, of New York, in the county and State of New York, have invented certain new and useful Improvements in Ambulances, of which the following is a full, clear, and exact description, reference being had to the accompanying drawing, which forms part of this specification and in which—

Figure 1:
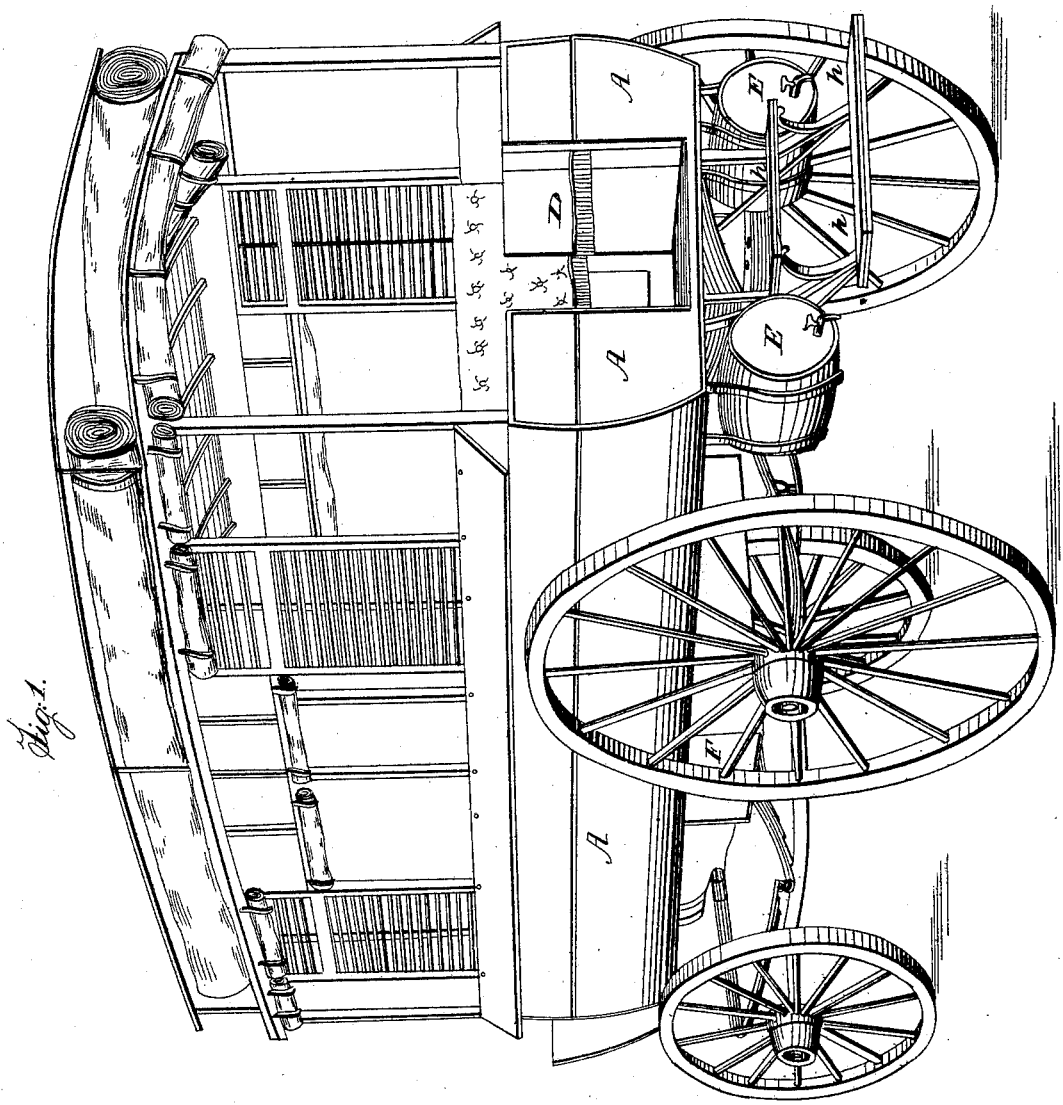
Figure 2:
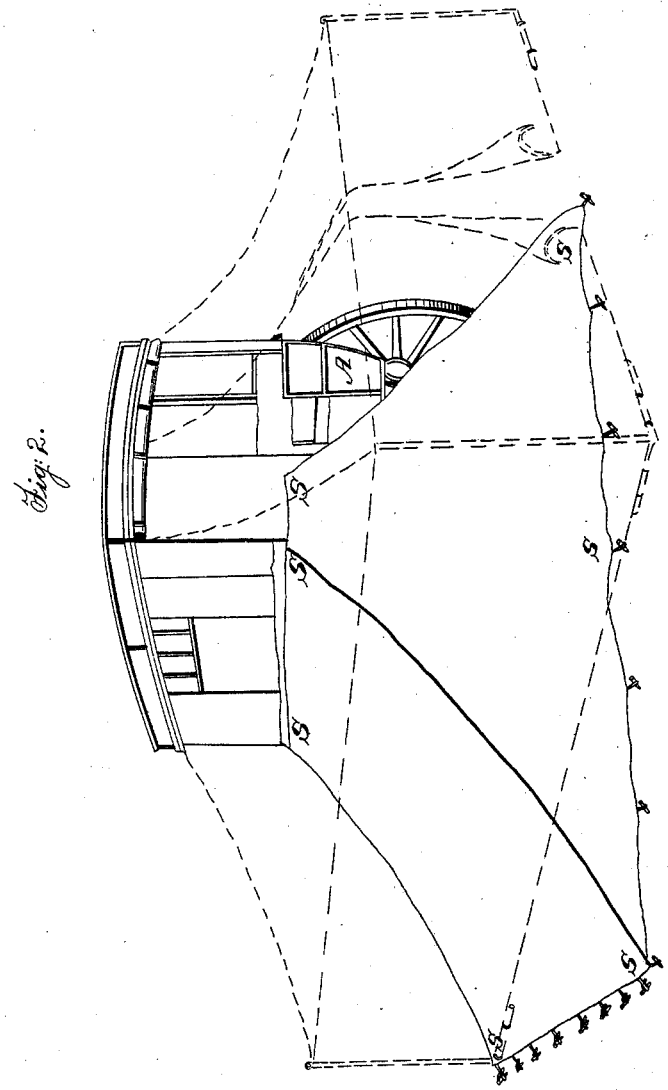

Figure 1 represents a view in perspective of the ambulance when in traveling order; Fig. 2 also a view in perspective or diagram of the ambulance in part with "tent" appliances, converting it into a stationary close or capacious field hospital or housing contrivance; Fig. 3 a longitudinal vertical section of the vehicle and Figs. 4 and 5 transverse vertical sections taken partly through the center and partly through the rear of the body of the vehicle.

My improvement relates to a vehicle especially applicable to army or emigrant trains. It may be used as a general transportation carriage or be designed more particularly for the sick and wounded of a company on the march, and is so constructed and provided as to be readily convertible into a stationary field hospital and close or capacious shelter for the night and against a too hot sun, also during bad weather or whenever circumstances require a halt.

In traveling across thinly inhabited or ill provided countries, the merits of my invention will be most fully appreciated and as will appear from the following description it differs in many important respects from previous ambulances, both in its construction to arrangement of well known details and in the addition of certain conveniences which have heretofore been foreign to vehicles of this description, and which, to make practicable or easy of adoption in journeying, especially over mountainous and difficult routes, it has here required no inconsiderable degree of invention, to discover or design the proper construction and arrangement thereof.

Though not restricting myself to any particular dimensions, I shall nevertheless mention in my description certain sizes of parts for the better elucidation of the advantages attached to my arrangement and it should be borne in mind that there are difficulties to be encountered such as narrow passes, steep inclines, rugged paths and so forth, that make size and weight important considerations.

Referring to the accompanying drawing the body A of the vehicle may be 13 feet 8 inches long; the height of the floor from the ground 3 feet 3 inches height inside 5 feet, or 8 feet 4 inches from the ground to the top of the vehicle; and the width 4 feet 4 inches. The estimated weight of the vehicle at these dimensions is about 2115 pounds (more or less) and said sizes give sitting accommodation to 18 persons, the seats for whom are arranged as follows: The box B in front, on which the driver sits, is designed to seat four abreast—six double seats C in the interior, three on either side, seat twelve persons; and two rear seats D in the interior, one on either side seat two more. The seats of the box B in front run across the vehicle, but the seats in the interior are differently arranged. These latter run along either side longitudinally of the vehicle, the seats on the one side facing the seats on the other side and separated therefrom by a passage up the center of the body as in "omnibus" arrangements of the present day. But said seats have a peculiarity of construction and arrangement of much importance. Thus the double seats C, three one either side, are formed in sections with front boards *a* hinged to them at their top and which when let down as shown in Fig. 4 serve to close in as lids the space underneath the seats; but which front boards *a* may be turned up into a horizontal position as shown in Fig. 5, to form an extension of the seat surface proper that is, in width or depth to constitute in connection with an adjoining seat or seats, a bed or beds when required said hinged front boards *a* having flaps or legs *b* hinged to them, to support them when extended, which flaps fold up or lie flat when the hinged boards *a* are not extended.

The height of the double seats C and depth of the hinged boards *a* I make such, as that, when the opposite front boards *a* of the seats on either side of the vehicle are extended, said opposite front boards will just, or thereabout meet each other so as to form a continuous "flat" across the vehicle and when the opposite front boards *a* of all the double-seats are extended, a continuous flat or level is formed, of the width of the interior of the vehicle and of the length of three double seats sufficient in extent to give sleeping or lying down accommodation for five or more persons. Or the two advance double seats on either side, alone may be so extended to form a bed for three or more persons; or two adjoining double seats on the same side, to make a bed for one only; and the arrangement, it will be observed is such that the seats so extended do not interfere with the sitting accommodation provided by the seats which are not extended whether the extended seats are immediately opposite or along side. Thus, the greatest convenience is afforded for lying and sitting at different and changeable positions in the vehicle without interference. Folding seats transversely arranged could not give the same accommodation either as regards convenience or extent in a like space one of these double seats C I provide with a close stool c open at the bottom for the relief of persons suffering from dysentery or diarrhea and to avoid the necessity of the person so suffering leaving the vehicle, or the vehicle, when on the march, being delayed.

The sides of the body A are provided with Venetian blinds to secure free circulation of air and to shade the interior; and in addition, are glass windows to give light when the blinds are closed.

The two rear seats D in the body of the vehicle, one on either side, are, or may be for the accommodation of the hospital steward and his attendant. These seats are both in the body of the vehicle and distinct from it by reason of their arrangement at the end of the body, and the provision which is made of a drop curtain d in advance of them and a sliding door p forming a lower continuation to the curtains and fitting in grooved uprights f to intersect the center aisle or passage, or the curtain alone may be used to form a partial division and the door e be arranged to fit in other grooved uprights I in the rear of said seats, and thus the door of the vehicle be either outside or inside of the two rear seats D. Or the drop curtain d may be raised and the door e alone be used to form the intersection between the body and two rear seats, or both curtain and door may be withdrawn from forming a division with the body. These changes will be found of much service both to the sick in the body of the vehicle and to the hospital steward and his attendant in the rear, protecting the latter persons from much that is offensive, annoying and injurious to health.

The sliding door e—see Fig. 3, is not shown in either of the positions here named but the grooved uprights f and g clearly indicate the two positions it may occupy as a door. It has however other functions in addition to those above set forth, which are obtained by so arranging said door e, that it may be also slid in horizontally from the rear of the vehicle (see Fig. 3) to serve as a desk for writing or as a counter for making up and dispensing medicines on, the steps h of the vehicle serving for the person so using it to stand on, when the vehicle is in motion;—or said table door may be slid entirely in along the floor of the rear portion of the body when not required to be used and an open coil is desired; grooved ways serving to guide and hold said door or table in its several positions named.

Underneath the body A are two water kegs E one on either side of the vehicle to form a balance, and within convenient reach from the steps of the vehicle to draw water from, yet said kegs being opposed to outside draft and to the external atmosphere to keep the water sweet and cool. These kegs may be provided with faucets at their rear ends and be carried or supported by straps attached to the vehicle in such a manner that the kegs may be removed from time to time to replenish or cleanse them.

In front of the vehicle underneath the driver's box B are two chests for rations, store, medicines or instruments. And, underneath the body (A), on either side, are two more like chests (F) for similar purposes. These chests are of peculiar construction and may be described as consisting (each one) of a drawer sliding outward from the vehicle for ordinary use, and provided with a number of boxes (i) of square form in their transverse section, lying side by side to form a close packing in the drawer and fitted with hinged lids along their one side or face which lids of the several boxes may be uppermost and in the same plane to be readily accessible when sliding out the drawer; but which arrangement admits of the boxes containing the different articles being taken out, turned and inserted in the drawer with their lids in a position at right angles to the bottom or top surface of the drawer, but equally as compact and close the one box to the other, as when the boxes occupied their previously described position, so that the chests (F) of boxes may be used as pannier chests and be slung one on either side of a mule without exposure of the lids of the boxes to open, when such detached (pannier) service is required to lighten the vehicle in traveling over a hilly or rough road.

Along either side of the vehicle in the interior I arrange hooks (k) and furnish the top of the vehicle in the inside along its center with additional hooks or rings (l) for the purpose of slinging up hammocks (G) two abreast and arranged longitudinally of the vehicle at a convenient distance from the roof, to serve as easy beds for two badly wounded or sick persons and to protect them against the rough jolting of the vehicle; or one hammock only may be suspended in the center from the rings (*l*) in the roof; or a wide stretcher or hammock bed may be stretched across the vehicle from the hooks (*k*) along either side of it to serve as an easy bed for three or more. In either case that is, whether one or more hammocks, the vehicle is balanced, or no greater weight thrown on the one than the other side thereby, which is of much importance to secure a safe and easy run to the vehicle in view of the altitude at which the hammocks are required to be pitched. The hammock or hammocks may be drawn closer up to the roof, when not required to be used or they may be unhooked taken down, rolled up and put away.

Around the ambulance on its exterior, at a distance of five feet or thereabout from the ground I arrange a series of hooks (*m*) and still higher up or near the top, a further series of hooks (*n*) similarly arranged. These hooks are for the purpose of attaching a canvas tent or tents encircling the vehicle, as represented in Fig. 2 of the drawing.

When the awning (S) as shown in black lines in said figure is attached to the lower series of the hooks (*m*) it forms a comfortable seat of large area for temporary shelter; or, when said awning is attached to the upper series of hooks (*n*) it forms an extensive and airy hospital tent for permanent shelter and during very hot weather.

The wales or supports of the tent, in either case, are removable at pleasure, and the vehicle is provided on the outside along either edge of the roof with a light iron railing against or along which the tents when not in use and rolled up may be packed as represented in Fig. 1, of the drawing; and here again, in this arrangement is the vehicle balanced. Said iron railing may also serve to retain the knapsacks of the party.

As the tents when pitched encircle the vehicle or are arranged on either side of it, not only is the vehicle "stayed" by the tents but the tents are "stayed" and made secure by the heavy vehicle which may serve as a central and general store room for the tents, when permanently pitched and will serve as a shade to the tents one of which by being arranged to leeward may be protected by the vehicle in cold and windy weather and be used as the hospital tent of the party to shelter the sickly. The unity of these several arrangements, their multiplied uses, sectional build to accommodate sitting or lying positions at different points and independently of each other or without interference, balancing disposition of them and their many and varied conveniences give to the ambulance a novel and useful character never before attained and which it is reasonable to conclude it has required some ingenuity to accomplish.

I am aware that several devices have been employed in emigrant wagons, traveling carriages and other vehicles of a similar nature to enable them to afford shelter and to perform in some degree the part of a domicile. But the necessity of reducing everything in an army deemed of an extraneous character to the mere purposes of combat has heretofore caused ambulances to be constructed in the simplest manner possible, with perfect disregard of comfort to the sick and of convenience to the attendants. My improvement is intended to overcome these objections by combining in one vehicle not only the means of transport and protection to the sick and wounded but the surgeon's office and stores as well as a hospital camp. Therefore I do not claim any of the devices employed by me separately and irrespectively of their peculiar construction and arrangement, but

I claim as new—

An army ambulance constructed and arranged as herein described, that is to say, having ability to transport the sick and wounded under cover, either lying or sitting by means of a system of sectional folding seats arranged along the sides as described, as also for carrying the surgeon's medicines and implements in removable cases fitting in and under said seats and arranged in drawer under the body of the vehicle so that said cases may be used for general or detached service as required; in the arrangement of an adjustable door capable of serving as a table as set forth; in the arrangement herein described of the hammocks for one, two or more persons; and in combining with the vehicle as a central support the tent necessary for the hospital camp—the whole being combined and operating as a connected device for transporting subsisting and protecting the sick and wounded of an army and their appropriate attendants as set forth herein.

In testimony whereof I have signed my name to this specification before two subscribing witnesses.

ISRAEL MOSES.

Witnesses:
ANTHONY POLLACK,
JOHN S. HOLLINGSHEAD.